United States Patent Office 3,810,920
Patented May 14, 1974

3,810,920
2 - SUBSITUTED TETRAHYDROPYRAN AND 2-SUBSTITUTED TETRAHYDROFURAN-2-PEROXY COMPOUNDS
Richard Anthony Bafford, Tonawanda, and Leonard Ernest Korczykowski and Orville Leonard Magelic, Buffalo, N.Y., assignors to Pennwalt Corporation, Philadelphia, Pa.
No Drawing. Original application Oct. 10, 1966, Ser. No. 585,295, now Patent No. 3,576,826, dated Apr. 27, 1971. Divided and this application Apr. 6, 1970, Ser. No. 31,059
Int. Cl. C07d 5/04, 7/04
U.S. Cl. 260—345.8
7 Claims

ABSTRACT OF THE DISCLOSURE

Ether peroxides of the formula

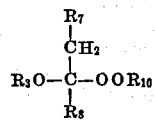

having low thermal stability due to the presence of an alkoxy group ($R_3O$—) on the same carbon atom to which the peroxy (—OO—) group is attached, such as bis-2,2'-(2-methyl-tetrahydrofuryl) peroxide, which are useful as polymerization initiators.

---

This application is a division of copending application Ser. No. 585,295, filed Oct. 10, 1966, now U.S. Pat. 3,576,826, dated Apr. 27, 1971.

This invention relates to a novel process for the preparation of ether peroxides and hydroperoxides having an ether oxygen and a peroxy oxygen attached to a common carbon atom. Also the invention relates to novel ether peroxides and hydroperoxides of this type.

Herein "peroxy" or "dioxy" refers to the "—OO—" group and "hydroperoxy" refers specifically to the "—OO—H" group.

In all instances herein the numerical subscript following "R," such as $R_{21}$ is being used as an identification tag only and is not intended to indicate the presence of more than one of said R's.

A need exists for radical initiators operable in the peroxyester temperature range but which do not contain carbonyl groups. Carbonyl residues on polymer chains have been considered to be the cause of poor light and oxidative stability in several commercial polymers.

Several resin manufacturers have expressed an interest in the possibility of using a dialkyl peroxide that would have a half-life near that of t-butyl perbenzoate. Three dialkyl peroxides were prepared; they were too thermally stable to be replacements for peroxyesters.

The diperoxyketals have half-lives in the peroxyester range but are reported to be very shock sensitive. The preparation of peroxyketals was patented by Shell in 1946 but the compounds were never offered on a commercial scale presumably because of their hazardous nature.

A principal object of this invention is to provide peroxides which have substantially the effectiveness of commercial peroxyesters, e.g., t-butyl perbenzoate.

Ropp in U.S. Pat. No. 2,776,319, Jan. 1, 1957 discloses a process for preparing ether peroxides by reacting a non-substituted vinyl ether and an organic hydroperoxide, using an acid catalyst. When the Ropp process is applied to an α-substituted vinyl ether the corresponding ether peroxide is obtained in very low yield as a part of a mixture of reaction products. This and other problems are illustrated later on herein.

Another principal object is a process for producing substituted ether peroxides in high yield and/or less by-product formation.

Instead of the ether proxides having the "substituent," the ether oxygen and a peroxy oxygen all on a common carbon atom, it is desirable to have the peroxy oxygen part of a hydroperoxy group. Such "ether hydroperoxides" cannot be obtained by the Ropp method.

Still another principal object is a process for producing substituted ether hydroperoxides.

Other objects will be apparent in the course of the detailed description of the invention.

A novel process for making ether peroxides or hydroperoxides has been discovered. Broadly the process involves the direct reaction, *in the absence of a catalyst*, of (I) an α-substituted vinyl ether:

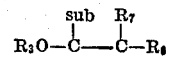

(II) with a peroxide: $R_{24}(OOH)_p$;
(III) to produce the corresponding substituted ether peroxide:

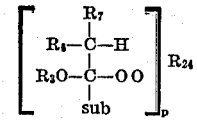

where:
(1) "sub" is an organic radical;
(2) $R_3$ is an aliphatic, cycloaliphatic or aromatic radical;
(3) $R_6$ and $R_7$ are H, aliphatic, cycloaliphatic or aromatic radicals;
(4) $R_{24}$ is H, aliphatic or cycloaliphatic radical;
(5) $p$ is an integer equal to at least 1, usually 1–3;
(6) $R_3O$—, C and sub together may form a ring; and
(7) sub, C, and —$CHR_6R_7$ together form a ring when sub, C and —$CR_6R_7$ together form a ring.

Also there has been discovered a novel class of ether peroxides and hydroperoxides having the formula:

(IV)
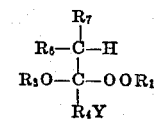

where: (a) $R_1$ is H, aliphatic, cycloaliphatic,

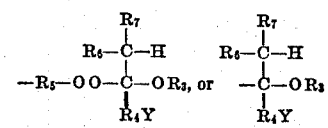

(b) $R_3$ and $R_4$ are aliphatic, cycloaliphatic or aromatic; (c) $R_5$ is aliphatic or cycloaliphatic; (d) $R_6$ and $R_7$ are H, aliphatic, cycloaliphatic, or aromatic; (e) C, $R_6R_7HC$— and —$OR_3$ together may form a ring; (f) C, $R_6R_7HC$— and —$R_4Y$ together mal form a ring; and Y is

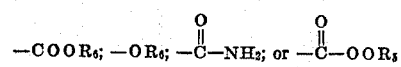

Further there has been discovered another novel class of ether peroxides having the formula:

(V)
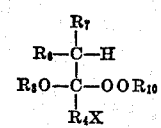

where: (i) $R_3$ and $R_4$ are aliphatic, cycloaliphatic or aromatic; (ii) $R_6$ and $R_7$ are H, aliphatic, cycloaliphatic, or aromatic; (iii) X is

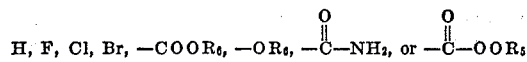

(iv) $R_5$ is aliphatic or cycloaliphatic; (v) $R_{10}$ is

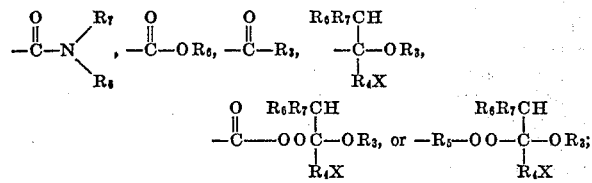

(vi) C, $-OR_3$ and $R_6H_7HC-$ together may form a ring; and (vii) C, $-R_4X$ and $R_6R_7HC-$ together may form a ring.

THE PROCESS OF THE INVENTION

In its briefest summation the instant process may be described as that of Ropp U.S. Pat. No. 2,776,319 applied to the α-substituted vinyl ether I and excluding the acid acting condensation catalyst.

However it must be pointed out immediately that the absence of acid catalyst permits a broader range of vinyl ethers and hydroperoxides to be used in the instant process; also hydrogen peroxide itself may be used as well as the organohydroperoxide.

Although the various R's present in vinyl ether I and hydroperoxide II can be substituted with non-hydrocarbon groups or radicals, more commonly these are hydrocarbon radicals.

"Sub" can be an organic radical; self-evidently, sub should not contain groups, etc. which would interfere with the reaction. (This is also true of the various R's.) More commonly, "sub" is a hydrocarbon radical, a halohydrocarbon radical, or a hydrocarbon radical substituted with an ester group, or ether group, or peroxyester group or amide group. The more commercial hydroperoxides are most likely to be used as $R_{24}(OOH)_p$.

Illustrative of these are the alkyl hydroperoxides and dihydroperoxides having up to 18 carbon atoms; the cycloalkyl hydroperoxides such as cyclohexyl hydroperoxide and Decalin hydroperoxide; olefin hydroperoxide especially the alkynyl such as dimethyl propynyl hydro-hydroperoxide, and di(peroxyisopropyl) benzene.

The reaction proceeds smoothly at temperatures below the decomposition temperature of the least stable reactant or product. Usually the reaction temperature is held below about 60° C. Reaction rates are convenient in range of about 0° C.–50° C. Ambient temperatures of about 15°–35° C. are convenient for most reaction systems.

The reaction is carried out in the liquid state in a non-aqueous medium, which may be provided by the reactants themselves, and the reaction may have to the carried out at elevated pressure.

Any inert liquid organic solvent for the particular reactants may be used. Illustrative are ethers; benzene hydrocarbons, such as benzene and toluene; saturated hydrocarbons such a petroleum ether, hexane, cyclohexane; halohydrocarbons.

The relative proportions of the reactants charged to the reaction zone may cover a broad range dependent on the particular reactants. In some cases an excess of one reactant over the other is desirable. However, it is been observed that charging about the stoichiometric proportion of reactants gives desirably good yields with a minimum of undesired side reaction products.

It is been found that particularly in small size batch reactions it is easier to control the temperature of the contents of the reactor charging all of one reactant, and solvent if any is being used, into the reactor; then the other reactant is added incrementally to the reactor at a rate such that the temperature is maintained at about the desired point. "Incrementally" includes addition of discrete quantities at regular intervals and also continuous addition at a controlled rate.

It is also possible, and probably preferable in a larger scale, to continuously intermingle two streams of reactants in a reaction system permitting close temperature control of the mixed stream. It is to be understood that the intermingling of the reactants is not limited to the above-described illustrative procedures.

The reaction rate and temperature control are facilitated by maintaining the contents of the reaction zone in an agitated condition both during the addition of the reactant or reactants and for a time after the reactants are completely charged to give the system time to reach substantially complete reaction.

In the use of hydrogen peroxide reactant any excess is decomposed by any conventional technique. If a solvent reaction medium has been used it is usually possible by proper selection of the solvent to remove the solvent from the reaction product mixture by distillation. As will be pointed out later in this specification the process of the invention can be controlled to produce substantially a single reaction product and therefore normally there will be no need to purify the reaction product. In those cases in which side reaction products have appeared it is usually possible to separate the desired product from the side reaction products by conventional techniques in the peroxide art, for example, vacuum distillation.

α-SUB VINYL ETHERS

Ethers of this type needed for use in this process are available commercially. Many methods for preparing these ethers are known, for example.

(1) Armitage, D. and Wilson, C., J. Am. Chem. Soc., 81 2437 (1959).

(2) Ansell, M. and Thomas, D., J. Chem. Soc., 1163 (1958).

(3) Trubnikov, I. and Pentin Yu., Zh. Obsch. Khim., 32, 3590 (1962).

(4) Winstein, S. and Ingraham, L., J. Am. Chim. Soc., 77, 1741 (1955).

(5) Dolliver, M., Gresham, T., Kistiakowsky, G., Smith, E., and Vaugh, W., J. Am. Chem. Soc., 60, 440 (1938).

(6) The commercial base-catalyzed addition of alcohols to acetylenes.

(7) The catalytic cracking of ketals over acid catalysts such as hydrogen chloride, sulfonic acid, and p-toluene sulfonic acid.

ILLUSTRATION OF METHOD 7

Preparation of α-sub cyclic vinyl ether 1-methoxy-3,3,5-trimethylcyclohexene

Here the ketal was not isolated but converted directly to the unsaturated ether.

A two-liter round bottom flask was equipped with a two-foot helices-packed column and a variable reflux take-off head. Attached to the take-off head thermometer was the "Thermocap" relay used to activate a "Flexopulse" timer set at a 10 to 1 reflux ratio.

In a 500 ml. flask was placed 70 g. (0.5 mole) of 3,3,5-trimethylcyclohexanone, 52 g. (0.5 mole) of 2,2-dimethoxypropane, 32 g. (1.0 mole) of methanol, 100 g. of cyclohexane and 0.1 g. of p-toluenesulfonic acid. The "Thermocap" relay was set at 52° C., the boiling point of the acetone-methanol-cyclohexane ternary azeotrope.

When the vapor temperature could not be kept at 52° C., the "Thermocap" was disconnected and distillation continued at 10 to 1 reflux ratio. The bath temperature was raised slowly to 190° C. (temperature of vapor never rose above 56° C.). When no further distillate came over, the oil bath was removed, the pot residue allowed to cool and sodium methoxide was added to neutralize the catalyst.

The pot residue was then distilled under reduced pressure through a 15 inch Vigreux column giving 71.5 g. of 1-methoxy-3,3,5-trimethylcyclohexene, boiling at 62–64°/C. at 13 mm. pressure, $n/_D^{25°}=1.4508$. The weight yield was 90.4% but analysis by vapor phase chromatography showed the presence of 9.6% ketone in the ether. The true yield was 82.5%.

The material was used "as is" in subsequent reactions with no deleterious effects.

ILLUSTRATION

Preparation of α-sub vinyl ether by vapor phase cracking of ketals

A novel method for the preparation of the α-substituted vinyl ethers cracks ketals in the vapor phase in the presence of solid acidic catalysts such as alumina, silica-alumina, and the like.

The ketal needed to produce the particular vinyl ether wanted can be made by the conventional alcohol exchange or ketone exchange reactions. Each of these is illustrated by an embodiment using 2,2-dimethoxypropane, a commercially available material, as one reactant.

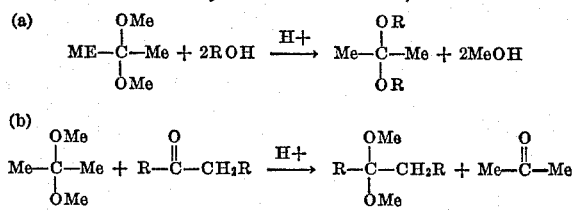

Preparation of 2,2-diisobutoxypropane

The alcohol exchange is illustrated:

A two-liter round bottom flask was equipped with a two-foot helices-packed column and a variable reflux take-off head. Attached to the take-off head thermometer was the "Thermocap" relay used to activate a "Flexopulse" timer set at a 10 to 1 reflux ratio. In the pot was placed 208 g. (2.0 moles) of 2,2-dimethoxypropane, 325.6 g. (4.4 moles) of isobutyl alcohol, 200 g. of cyclohexane and 0.2 g. of p-toluene sulfonic acid. The flask was surrounded by a 110–120° C. oil bath. The thermocap relay was set to operate at 54°, the boiling-point of the 62% cyclohexane-38% methanol azeotrope. The reaction was continued until the temperature of the vapors could not be kept at 54° C. The oil bath was then removed. The cyclohexane in the distillate was recovered by extracting the methanol with a water wash. When the pot residue had cooled, sodium methoxide in methanol (from 0.5 g. of sodium and 25 ml. of methanol) was added to neutralize the acid. The oil bath was then taken to 130° C. and distillation resumed at 10 to 1 reflux ratio. When no further distillate came over, the residue was distilled under reduced pressure. After a small forefraction of cyclohexane and isobutyl alcohol, 293.5 g. (78%) of 2,2-diisobutoxypropane was collected at 91–93° C. at 45 mm. pressure.

Preparation of alkyl isopropenyl ethers

This is an example of the solid catalytic cracking of a ketal to give the corresponding unsaturated ether.

A 25 mm. O.D. Pyrex tube was packed for a length of seven inches with "Alcoa" ⅛″ spherical catalytic alumina F-110. Through the center of the vertical tube was a thermometer with the bulb about ¾ of the length down the column. The column was electrically heated with tape and insulated with glass wool. On the top of the column was a dropping funnel charged with 2,2-dimethoxypropane. The cracked vapors passing out the bottom of the tube were condensed by a coiled tube condenser through which was circulated cold water. The receiver was protected with a calcium chloride tube and provision for nitrogen flushing of apparatus and was immersed in an ice bath. The column was heated to an internal temperature of 150° C. and kept between 140° C. and 160° C. (mostly at 155° C.) while about 125 g. of ketal was dropped through the column in two hours. To the condensate was added about 0.1 g. of sodium before it was distilled at atmospheric pressure through a two foot helices packed column, 59 g. of methyl isopropenyl ether was collected at 32–33° C. This corresponds to a conversion of 68.3%. In this experiment the residue was not recycled.

In the preparation of isoamyl isopropenyl ether, as above, uncracked ketal was recycled four times giving 60% and 62% conversions on the third and fourth passes through the column.

Isopropyl isopropenyl ether and isobutyl isopropenyl ether were also made by the above procedure.

Preparation of alkoxycycloalkenes

Cyclic ketals are readily made by the ketone exchange reaction. These readily crack in the vapor phase solid catalytic cracking reaction to give the corresponding substituted cyclic vinyl ethers. The known vinyl ether: 1-methoxycyclohexene was made. The following new compounds were made: 1-methoxycyclopentene; 1-methoxy-3,3,5-trimethylcyclohexene; 1-methoxycycloheptene; and 1-methoxycyclooctene.

ILLUSTRATION OF ROPP METHOD RESULTS

Methyl isopropenyl ether was added to a cold (0–5°) ethereal solution of t-butyl hydroperoxide and a catalytic quantity (one drop) of concentrated sulfuric acid. The reaction is exothermic and the temperature was controlled by the rate of addition of the vinyl ether and external cooling. The mixture was then stirred several hours although it is very likely that the reaction is very fast. The reaction mixture was washed with 10% potassium hydroxide to destroy the catalyst and to remove any excess hydroperoxide. The ethereal solution was then washed with water, dried over sodium sulfate and stripped in vacuo.

The active oxygen assays were consistently greater than theoretical even though unreacted hydroperoxide was completely absent from the products. It was at first believed that the fault lay with the assay method. A sample of 2-methoxy-2-t-butylperoxy propane was distilled under reduced pressure through a short column. Although the material distilled over a narrow range, a VPC scan at 80° on a 6 foot diisodecyl phthalate on 60–80 WAW810 column showed two sharp bands one at 13.7 min., the other at 40.4 min. By careful fractionation, two fractions were separated. Fraction B distilled at 36–41° at 4–5 mm.; $n_D^{25}$ 1.3995; active oxygen 10.7% (theory for 2-methoxy-2-t-butylperoxy propane 9.87%).

Fraction A distilled at 44–46° at 4–5 mm.; $n_D^{25}$ 1.4063; active oxygen 14.2% (theory for 2,2-bis-t-butylperoxy propane 14.5%). That fraction A was 2,2-bis-t-butylperoxy propane was established by the synthesis of an authentic sample from acetone and t-butyl hydroperoxide (its properties; active oxygen 14.3%; $n_D^{25}$ 1.4064). The infrared spectrum of fraction A and authentic 2,2-bis(t-butylperoxy) propane were superimposable. Even when stoichiometric quantities of methyl isopropenyl ether and t-butyl hydroperoxide were used with an acid catalyst, the active oxygen assay was high.

It was postulated that the methoxy group of 2-methoxy-2-t-butylperoxy propane exchanged with t-butyl hydroperoxide in the presence of an acid catalyst to give 2,2-bis(t-butylperoxy) propane.

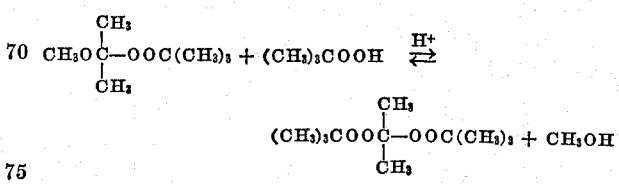

This was established by exchanging one and both methoxy groups of 2,2-dimethoxypropane with t-butyl hydroperoxide using an acid catalyst.

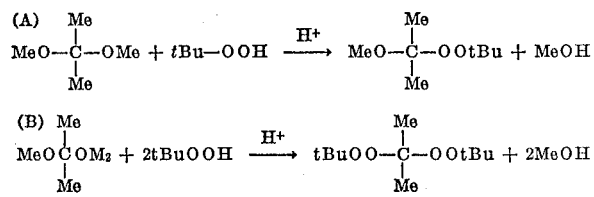

ILLUSTRATIONS OF THE PROCESS OF THE INVENTION

It was discovered that hydroperoxides add to α-sub-vinyl ethers *quantitatively* in the *absence* of acid catalyst. On the other hand non-substituted vinyl ethers react very slowly, some not at all, in the absence of an acid catalyst. t-Butyl hydroperoxide quantitatively adds to isopropyl isopropenyl ether to give 2-isopropoxy-2-t-butylperoxy propane. At identical reaction conditions less than a 10% yield of α-t-butoxy-α-t-butylperoxy ethane was obtained from t-butyl vinyl ether.

This catalyst-free process possesses several important advantages over the acid-catalyst process: (a) there is no alkoxy group exchange even when excess hydroperoxide is present, (b) washing of the product is unnecessary, (c) the reaction is less exothermic than the catalyzed reaction, therefore temperature control is simplified and, (d) because of (c), a reaction solvent medium is not necessary but may be used.

EXAMPLE 1

2-isopropoxy-2-t-butylperoxy propane

To a well-stirred solution of 11.5 g. (0.115 mole) of isopropyl isopropenyl ether in 50 ml. of ether was slowly added 9.1 g. (0.1 mole) of 99% t-butyl hydroperoxide. The addition required 40 minutes. There was a slight exotherm and temperature rose to 30°. Stirring was continued for 1 hour; then at 32–34° (warm water bath) for 1½ hours. The ether was removed under reduced pressure leaving 18.5 g. of a colorless oil containing 7.28% active oxygen (theory, 8.41%). An infra-red spectrum of the oil was free of OH absorption but showed as light >C=C< absorption.

The oil was stripped for an additional 20 minutes under water pump vacuum. The residue weighed 17.3 g. (91.1% yield) and assayed 8.19% active oxygen (97.4% of theory).

EXAMPLES 2–3

Using the appropriate reactants in the process of Example 1 the following were made.

(2) 2-methoxy-2-t-butylperoxy butyric acid, ethyl ester.
(3) 2-ethoxy-2-t-butylperoxy butyric acid.

A pure butyric acid of Example 3 was not obtained. The product included some 2,2-bis(t-butylperoxy)butyric acid.

EXAMPLE 4

2-methyl-2-hydroperoxytetrahydrofuran

An ethereal solution of hydrogen peroxide was prepared by extracting 70% hydrogen peroxide with ether and drying the ethereal extracts for 16 hours over sodium sulfate.

To 550 ml. of an ethereal solution containing 46 g. (1.35 mole) of hydrogen peroxide in a jacketed reactor was added over a 30 minute period 60 g. (0.715 mole) of 2-methylene tetrahydrofuran. The temperature was maintained at 22–24° during the addition. The mixture was then stirred for 7 hours at 28–32°. The reaction mixture was then washed with 40% aqueous ammonium sulfate until free of hydrogen peroxide (catalase test). The ethereal solution was then dried over sodium sulfate, filtered and stripped in vacuo. The residue of 2-methyl-2-hydroperoxy-tetrahydrofuran weighed 57.7 g. (68.5% yield) and assayed 12.4% active oxygen (theory 13.5% A.O.). An infrared spectrum showed a weak band at 1650 cm.$^{-1}$, indicative of a small amount of unreacted unsaturated ether in the product.

In a smaller run an 89% yield of the hydroperoxide was obtained and it assayed 86.4% of theoretical active oxygen.

A portion of the product was distilled under reduced pressure; B.P. 41–43° at 0.6 mm.; $n_D^{25}$ 1.4460; active oxygen 95.6% of theory.

EXAMPLE 5

2-isoamyloxy-2-hydroperoxy propane was prepared in a similar manner. However, the reaction was much slower.

EXAMPLE 6

2-methyl-2-hydroperoxy tetrahydropyran was prepared in a similar manner.

COMPOUNDS

In Table 1 are listed peroxyesters, peroxycarbonates and peroxycarbamates of these three alkoxyhydroperoxides with their assays and half-lives.

TABLE 1

| | Yield, percent | Assay, percent | t½ (° C.) | |
|---|---|---|---|---|
| 1 — 2-methyl-2-perbenzoxy tetrahydrofuran | 78 | 99.6 | 3.2 hours | (85) |
| 2 — 2-methyl-2-peracetoxy tetrahydrofuran | 36 | 89.6 | 20.0 hours | (85) |
| 3 — 2-methyl-2-perpivaloxy tetrahydrofuran | 67 | 95.3 | 6.2 hours | (50) |
| 4 — 2-methyl-2-tetrahydrofurylperoxy N-cyclohexyl carbamate | 66 | 99.4 | (¹) | |
| 5 — 2-methyl-2-tetrahydrofurylperoxy N-methyl carbamate | 100 | 94.9 | 22.8 hours | (70) |
| 6 — 2-methyl-2-tetrahydrofurylperoxy, isopropyl carbonate | 62 | 97.6 | 3.2 hours | (85) |
| 7 — 2-methyl-2-perbenzoxy tetrahydropyran | 89 | 96.0 | 10.2 hours | (50) |
| 8 — 2-methyl-2-perpivaloxy tetrahydropyran | 57 | 96.3 | 2.1 hours | (50) |
| 9 — 2-methyl-2-tetrahydropyranylperoxy isopropyl carbonate | 70 | 95.8 | 10.6 hours | (50) |
| 10 — 2-isoamyloxy-2-perbenzoxy propane | 100 | 95.0 | 7.7 hours | (85) |
| 11 — 2-isoamyloxy-2-perpivaloxy propane | 34 | 99.0 | 2.9 hours | (50) |
| 12 — 2-isoamyloxy-2-propyleroxy, isopropyl carbonate | 47 | 94.3 | 4.1 hours | (85) |
| 13 — 1-methoxy-1-perbenzoxy cyclohexane | 46 | 63.5 | (²) | |

¹ Not stated because this compound did not decompose in the conventional first order manner.
² Not determined because of low assay.

COMPOUNDS

The dialkoxy peroxides in Table 2 were prepared by adding the unsaturated ether to α-alkoxyhydroperoxide.

TABLE 2

| | Assay, percent | Yield, percent | t½ (° C.) | |
|---|---|---|---|---|
| 14 — Bis 2,2'(2-methyltetrahydrofuryl) peroxide | 93.2 | 74 | 17.8 | (100) |
| 15 — Bis 2,2'(2-methyl tetrahydropyranyl) peroxide | 89.4 | 100 | 29.2 | (85) |
| 16 — Bis 6,2'(2-isoamyloxypropyl) peroxide | 50 | 97.4 | (¹) | |

¹ Not determined because of low assay.

POLYMERIZATION

The initiator efficiencies of these "peroxides" were calculated from styrene polymerization data obtained by conventional dilatometry. The polymerization data are summarized in Table 3.

TABLE 3.—STYRENE POLYMERIZATION

Peroxide (CH₂)n—O—C(CH₃)(OOCR)

| | n | R | Polymerization temp., °C. | Polymerization rate at 10% conversion, m./l. min. ×10³ |
|---|---|---|---|---|
| 17 | 3 | Phenyl | 85 | 2.91 |
| 18 | 3 | Methyl | 85 | 3.01 |
| 19 | 3 | t-Butyl | 50 | 2.24 |
| 20 | 3 | Methylamino | 70 | 2.48 |
| 21 | 3 | Isopropoxy | 85 | 3.01 |
| 22 | 4 | t-Butyl | 50 | 3.28 |

$$CH_3CH(CH_3)CH_2CH_2O\overset{CH_3}{\underset{CH_3}{C}}-OO\overset{O}{C}R$$

| | R | | | |
|---|---|---|---|---|
| 23 | Phenyl | | 85 | 5.12 |
| 24 | t-Butyl | | 50 | 2.86 |
| 25 | Isopropoxy | | 85 | 7.32 |
| 26 | (¹) | | 100 | 8.62 |
| 27 | (²) | | 85 | 4.12 |

¹ Bis 2,2'(2-methyltetrahydrofuryl) peroxide.
² Bis 2,2'(2-methyltetrahydropyranyl) peroxide.

VINYL CHLORIDE 2-methyl-2-perpivaloxytetrahydrofuran was compared to t-butyl perpivalate as an initiator in vinyl chloride polymerization at 50° C. The amount of initiator per 100 g. of monomer required to give 90% conversion to polymer was 0.050 g. of perpivalate and 0.042 g. of 2-methyl 2-perpivaloxy tetrahydrofuran.

COMPOUNDS IV

It is to be understood that the compounds set out in structural Formula IV herein are indeed as broad as so defined. The new process herein permits reactions to proceed even though the reactants are "complex" compounds as long as substituents do not interfere with the addition reaction at the vinyl bond.

In addition to species of Formula IV already disclosed the following species are set out, in their structural form, to illustrate compounds coming within the definition of Formula IV.

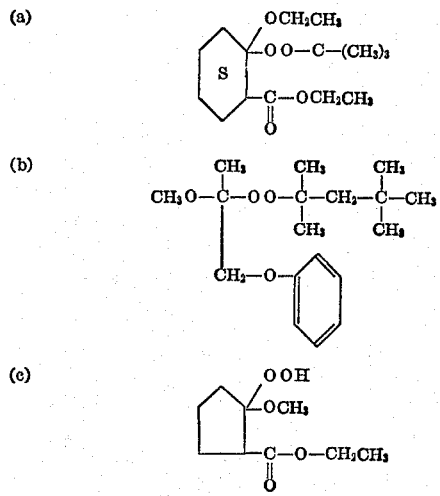

COMPOUNDS V

The broad statement made with respect to Compounds IV is also applicable to the compounds set out in structural Formula V. Additional species of this group identified as Compounds V, in their structural form, are set out as illustrative of this group.

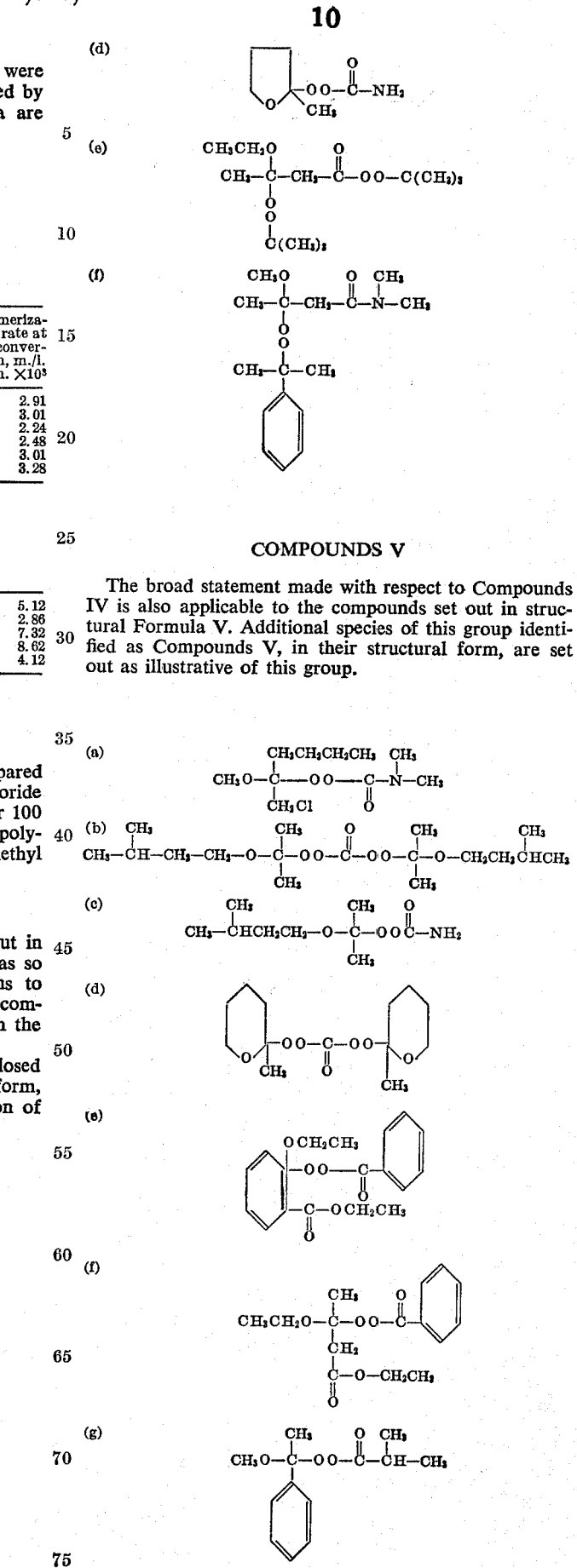

(h) 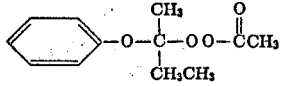

(i) 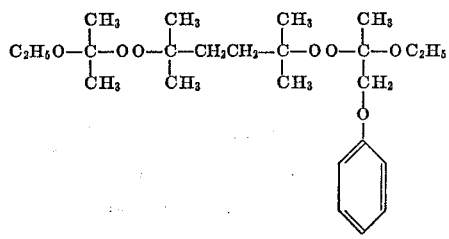

(j) 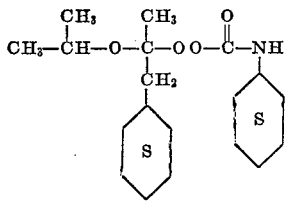

Thus having described the invention what is claimed is:

1. An ether peroxide having the formula:

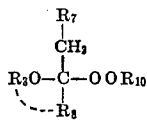

where:
$R_3O$—C—$R_8$ together form a tetrahydrofuran or tetrahydropyran ring;

$R_{10}$ is

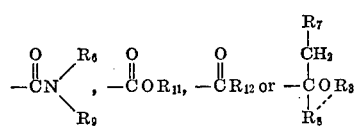

$R_7$ is H, alkyl of 1–3 carbons or cyclohexyl;
$R_6$ and $R_9$ are H—, methyl or cyclohexyl;
$R_{11}$ is alkyl of 1–3 carbons; and
$R_{12}$ is alkyl of 1–4 carbons or phenyl.

2. An ether peroxide of claim 1 wherein $R_7$ is H.
3. An ether peroxide of claim 2 wherein $R_6$ is H.
4. The peroxide 2-methyl-2-perbenzoxy tetrahydropyran.
5. The peroxide 2-methyl-2-tetrahydrofurylperoxy N-methyl-carbamate.
6. The peroxide bis-2,2'-(2-methyl-tetrahydrofuryl) peroxide.
7. The peroxide bis-2,2'-(2-methyl-tetrahydropyranyl) peroxide.

References Cited
UNITED STATES PATENTS
3,030,386   4/1962   Weissermel et al. __ 260—347.8

OTHER REFERENCES

Milas et al.: J. Am. Chem. Soc. (1954), vol. 72, pp. 2322–5.
Milas et al.: Chem. Abstr. (1955), vol. 49, pp. 8090–1.
Zozulya et al.: Chem. Abstr. 1964, vol. 60, p. 1119h.

HENRY R. JILES, Primary Examiner

B. I. DENTZ, Assistant Examiner

U.S. Cl. X.R.

260—345.7, 345.9, 347.3, 347.4, 347.8, 453, 463